United States Patent [19]

Cooke

[11] Patent Number: 5,379,728
[45] Date of Patent: Jan. 10, 1995

[54] FUEL SUPPLY SYSTEM FOR INTERNAL COMBUSTION ENGINES

[75] Inventor: Syd L. Cooke, Folsom, Calif.

[73] Assignee: TransGlobal Technologies, Limited, Belize City, Belize

[21] Appl. No.: 69,391

[22] Filed: Jun. 1, 1993

[51] Int. Cl.$^6$ .............................................. F02B 43/08
[52] U.S. Cl. .................. 123/3; 123/DIG. 12; 123/557; 123/568
[58] Field of Search ............. 123/3, DIG. 12, 557, 123/59 EC, 593, 568

[56] References Cited

U.S. PATENT DOCUMENTS

| | | |
|---|---|---|
| 3,618,576 | 11/1971 | Dixon . |
| 3,736,745 | 6/1973 | Karig . |
| 3,896,774 | 7/1975 | Siewert ........................... 123/59 EC |
| 3,963,000 | 6/1976 | Kosaka et al. ........................ 123/3 |
| 4,008,692 | 2/1977 | Shinohara et al. ................... 123/3 |
| 4,041,910 | 8/1977 | Houseman ..................... 123/59 EC |
| 4,059,076 | 11/1977 | Kosaka et al. . |
| 4,089,314 | 5/1978 | Bernecker ........................... 123/593 |
| 4,108,114 | 8/1978 | Kosaka et al. ................. 123/59 EC |
| 4,204,401 | 5/1980 | Earnest . |
| 4,350,133 | 9/1982 | Greiner . |
| 4,567,857 | 2/1986 | Houseman et al. . |
| 4,735,186 | 4/1988 | Parsons . |
| 4,802,445 | 2/1989 | Robertson, Jr. . |
| 5,002,481 | 3/1991 | Forster . |
| 5,161,365 | 11/1992 | Wright . |

Primary Examiner—Willis R. Wolfe
Assistant Examiner—Erick Solis
Attorney, Agent, or Firm—Thomas R. Lampe

[57] ABSTRACT

Apparatus and method for supplying fuel to an internal combustion engine. The heated exhaust gases from the internal combustion engine are brought into direct and indirect contact with a liquid hydrocarbon fuel to vaporize the liquid hydrocarbon fuel and form a mixture of vaporized liquid hydrocarbon fuel and heated exhaust gases. The mixture is passed through a passageway and further heated by non-contacting exhaust gases from the internal combustion engine to reform the mixture to hydrogen gas within the passageway for combustion in the internal combustion engine.

13 Claims, 8 Drawing Sheets

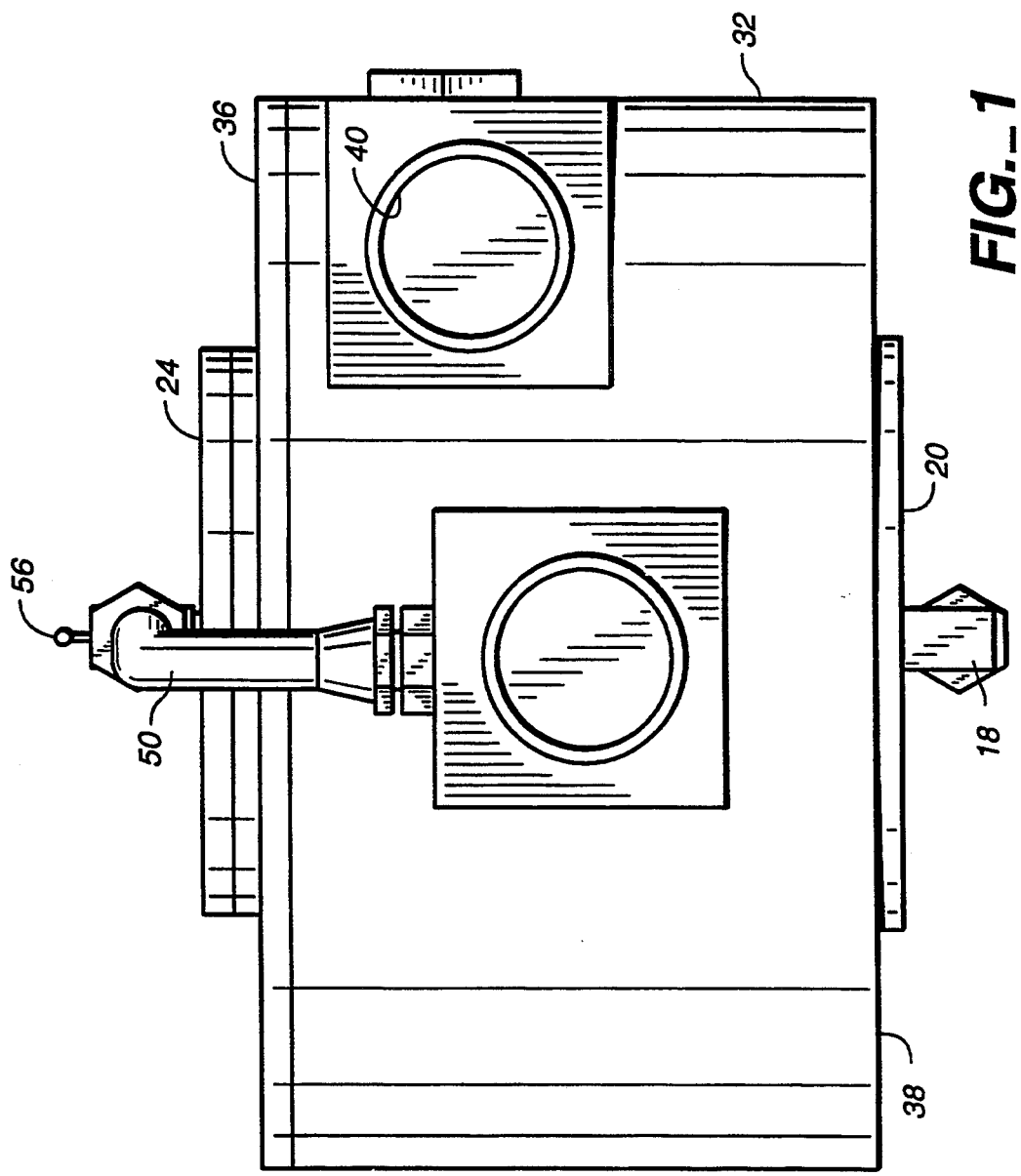
FIG._1

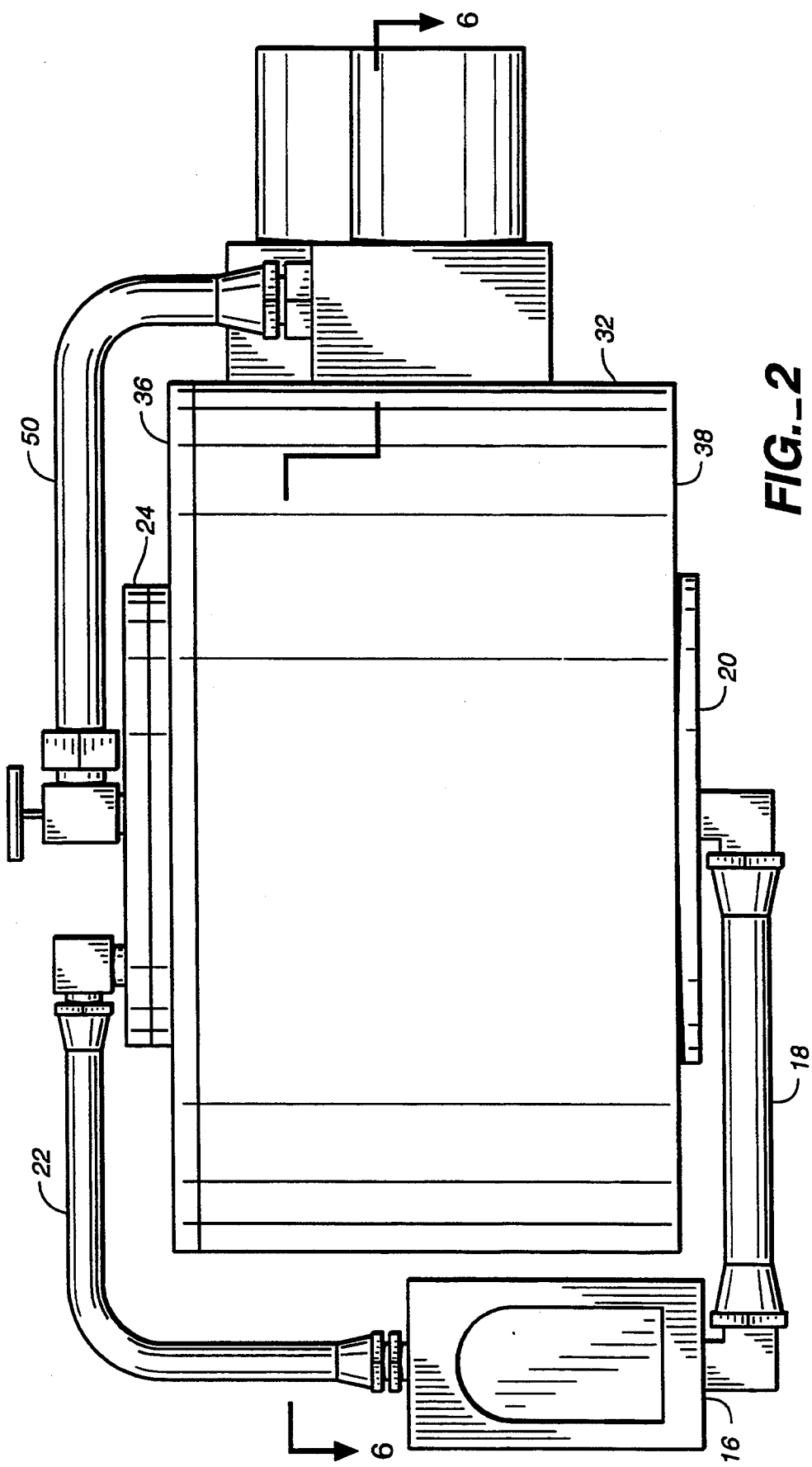
FIG._2

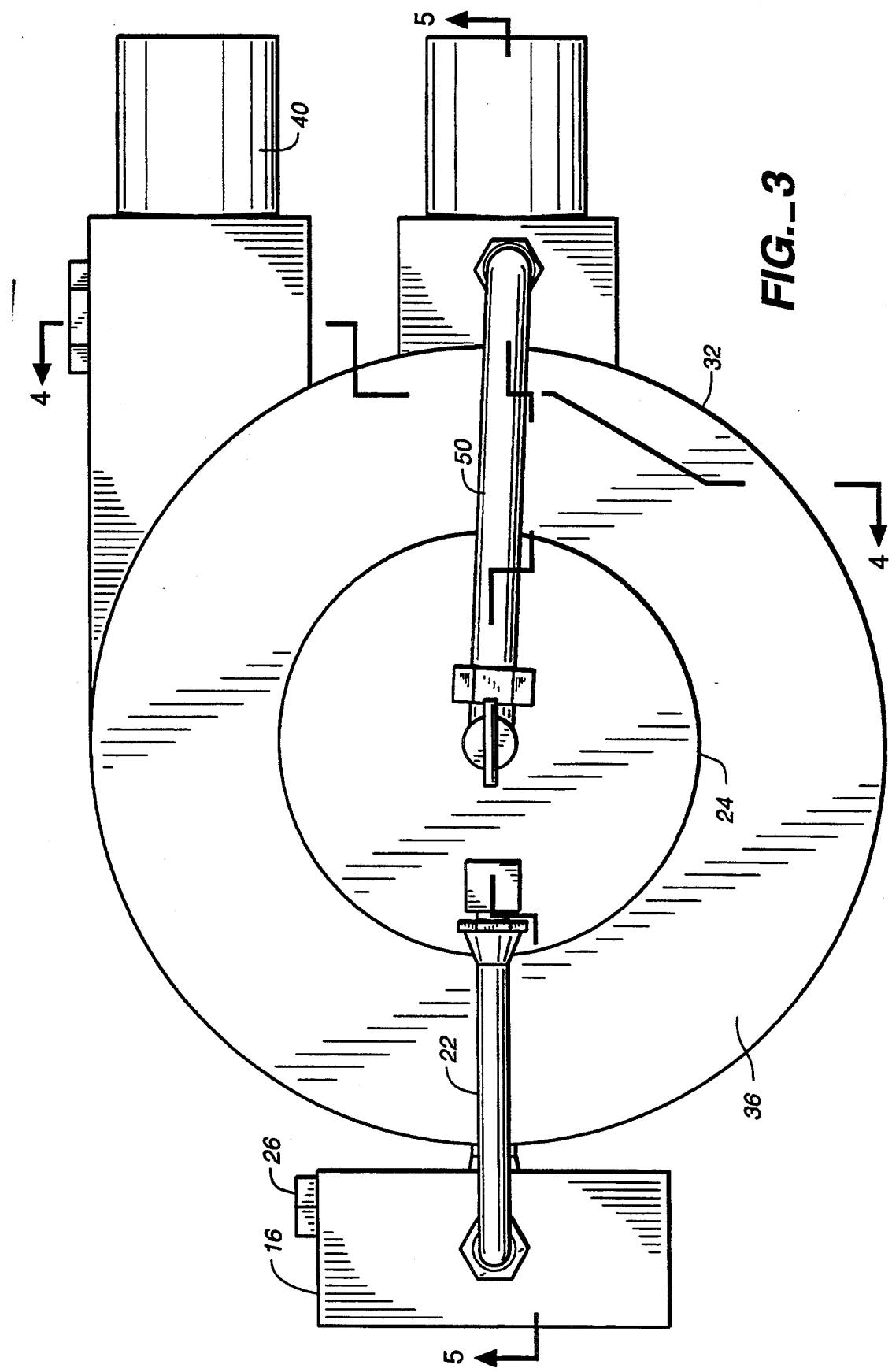
FIG._3

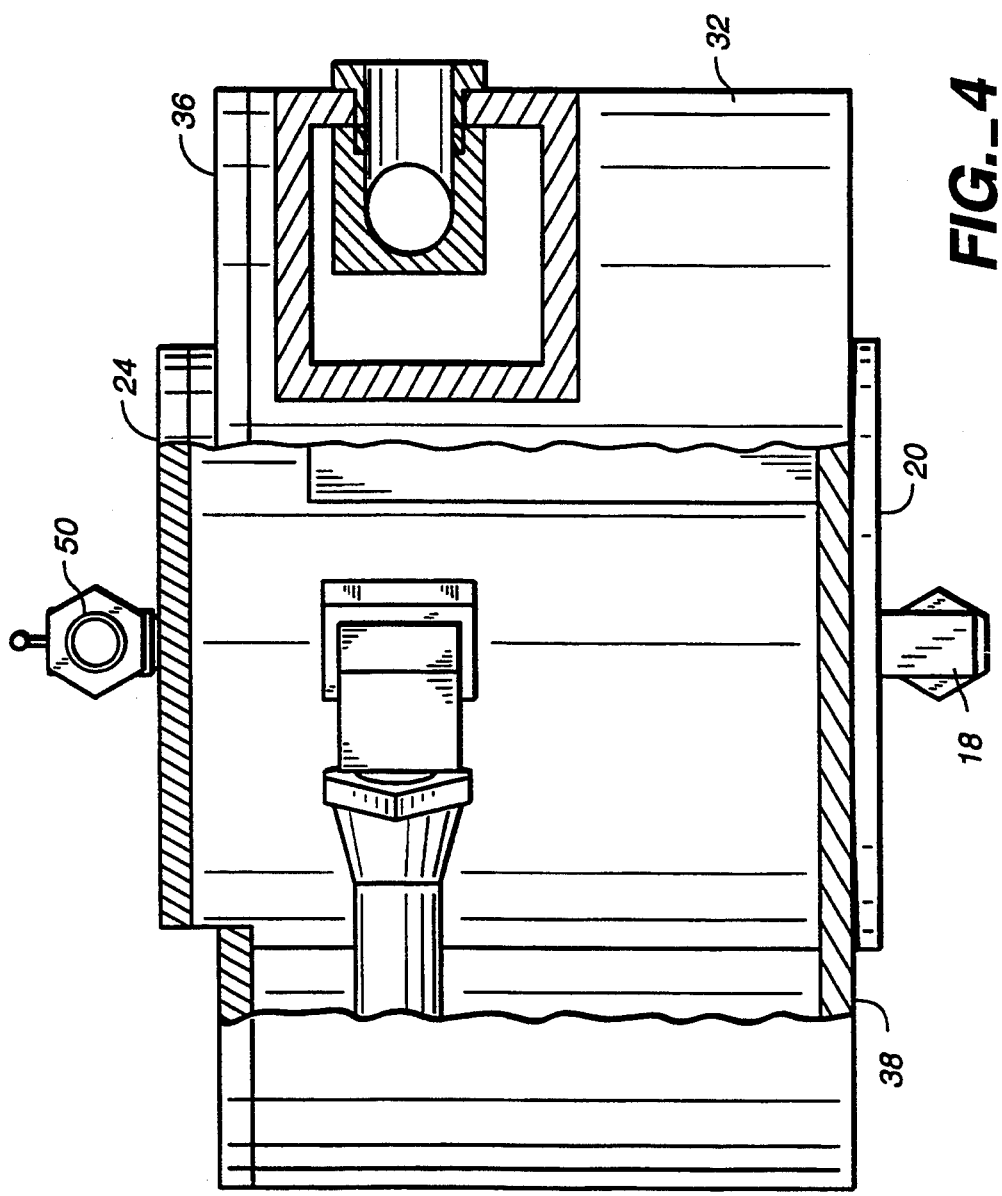
FIG._4

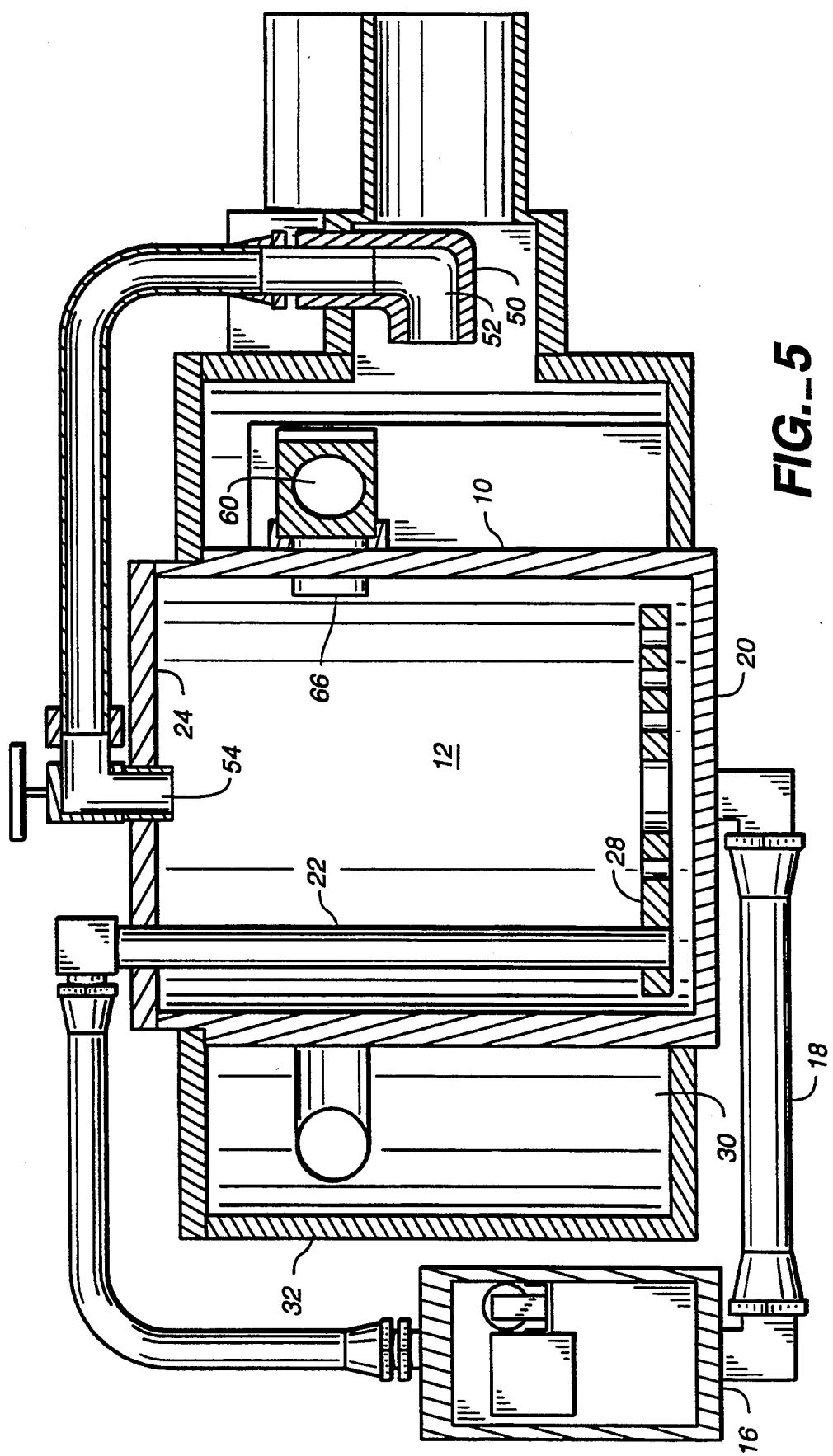
FIG._5

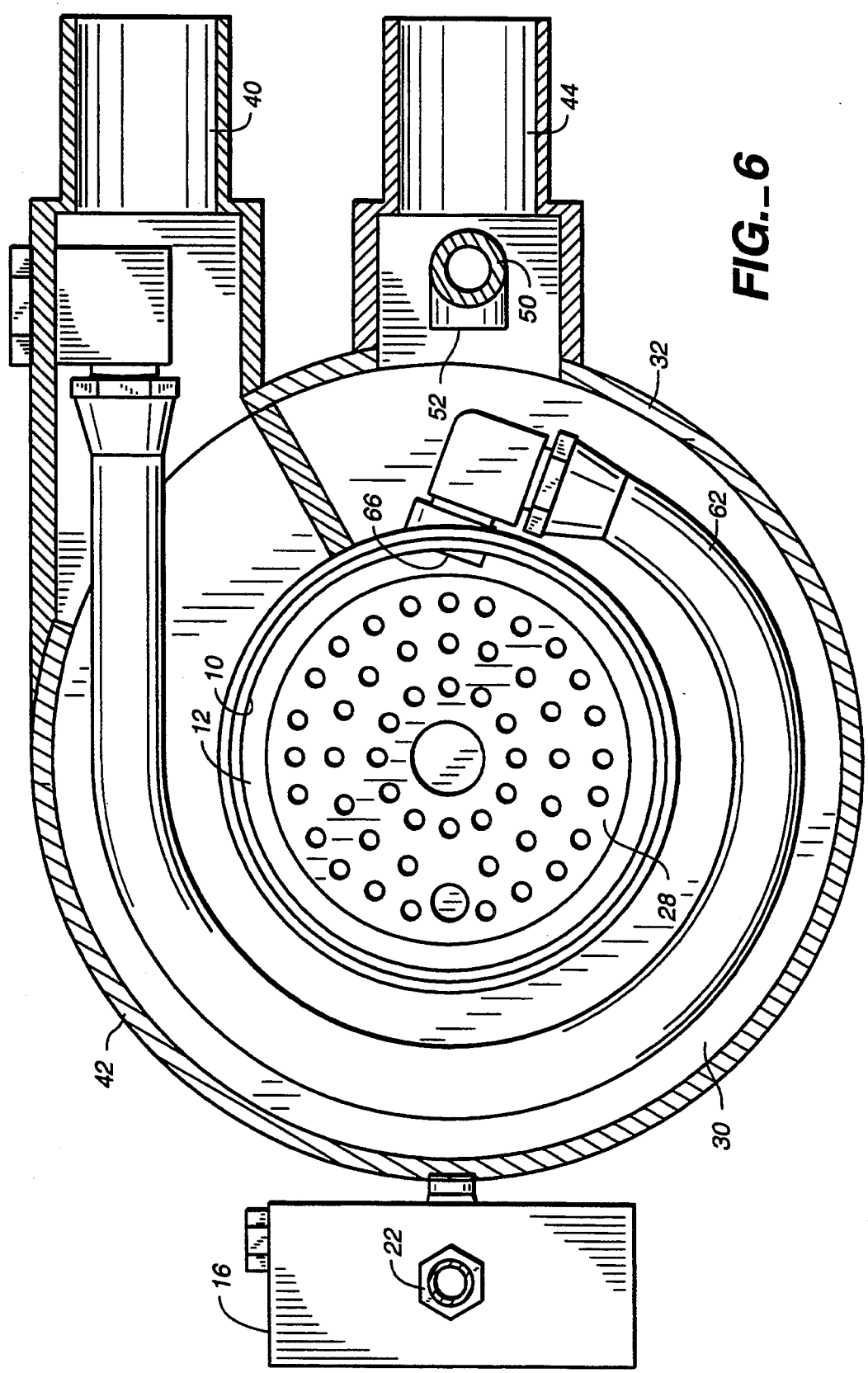
FIG._6

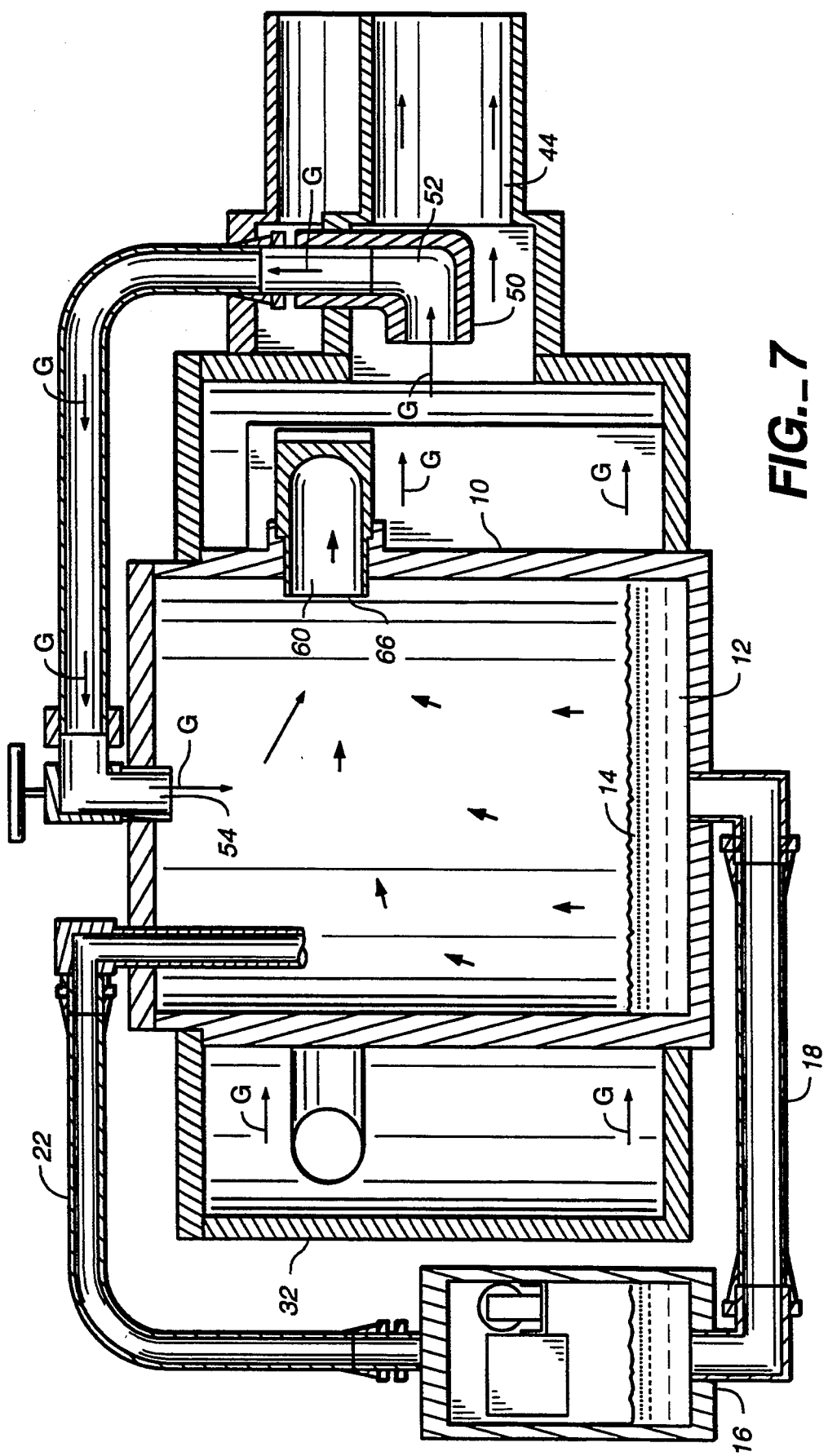
FIG._7

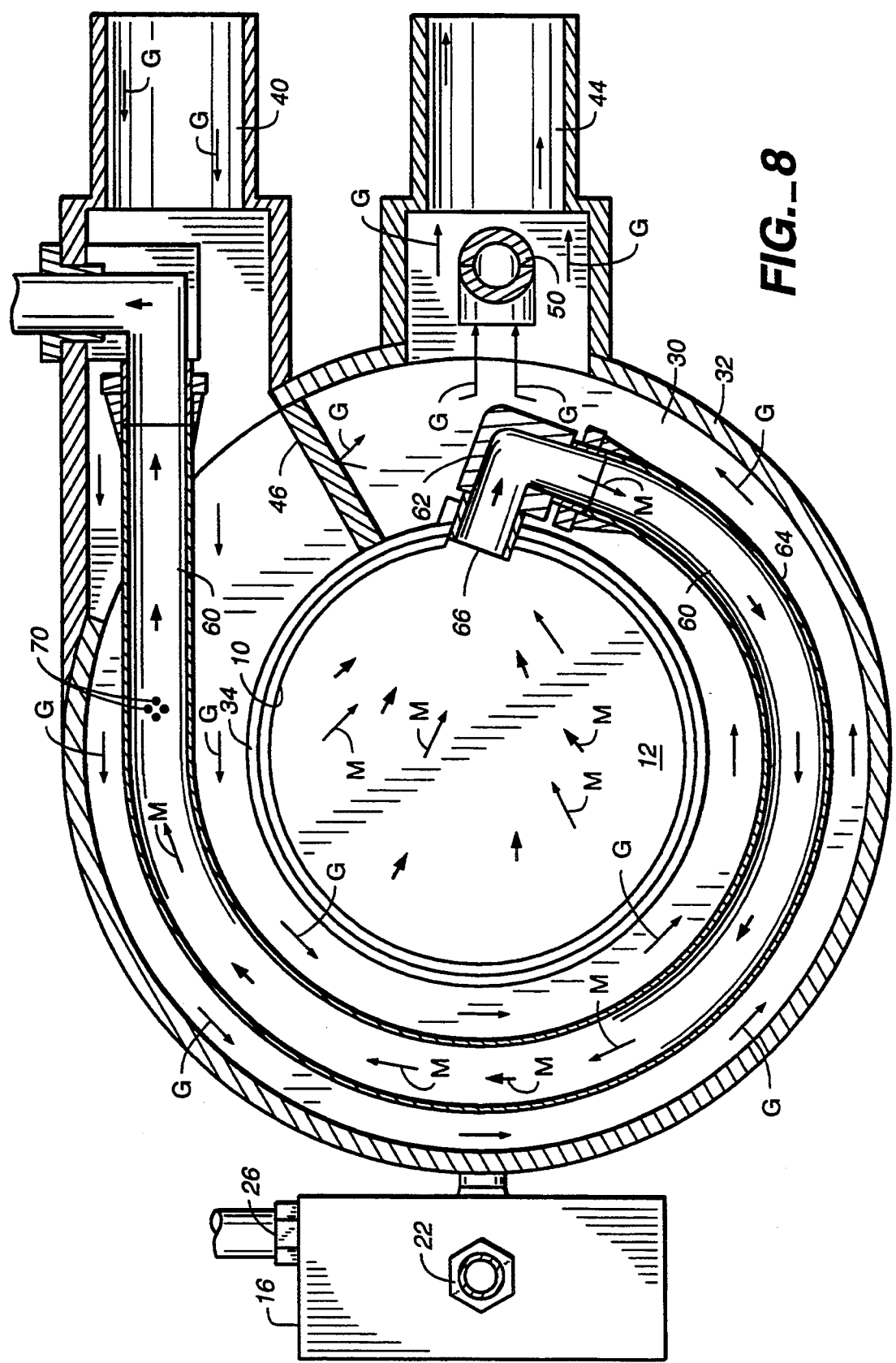
FIG._8

FUEL SUPPLY SYSTEM FOR INTERNAL COMBUSTION ENGINES

TECHNICAL FIELD

This invention relates to an apparatus and method for supplying fuel to internal combustion engines. More particularly, the apparatus and method of the invention are utilized to reform liquid hydrocarbon fuels to hydrogen gas for combustion in internal combustion engines.

BACKGROUND ART

Many arrangements are known in the prior art for cleaning the exhaust of internal combustion engines so that harmful materials produced during combustion are not emitted into the atmosphere in harmful quantities. One widely employed arrangement for accomplishing this end result is the catalytic converter. Not only are such arrangements relatively expensive and complex, they often require hydrocarbon liquid fuels of a precise nature or character to operate efficiently or even at all. Of course, many internal combustion engine designs require liquid hydrocarbon fuels of a specified type to function at all, even in the absence of associated specialized emission control equipment.

A search directed to the present invention located the following U.S. patents: U.S. Pat. No. 5,161,365, issued Nov. 10, 1992, U.S. Pat. No. 4,350,133, issued Sep. 21, 1982, U.S. Pat. No. 5,002,481, issued Mar. 26, 1991, U.S. Pat. No. 4,204,401, issued May 27, 1980, U.S. Pat. No. 4,802,445, issued Feb. 7, 1989, U.S. Pat. No. 4,059,076, issued Nov. 22, 1977, U.S. Pat. No. 4,735,186, issued Apr. 5, 1988, U.S. Pat. No. 3,736,745, issued Jun. 5, 1973, U.S. Pat. No. 4,567,857, issued Feb. 4, 1986, and U.S. Pat. No. 3,618,576, issued Nov. 9, 1971.

Some of the aforesaid patents generally teach the concept of decomposing or reforming certain types of liquid hydrocarbon fuels to produce hydrogen gas. For example, U.S. Pat. No. 4,350,133 discloses an alcohol fuel burner and decomposer in which one stream of fuel is preheated by passing it through an electrically heated conduit to vaporize the fuel. The fuel vapor is mixed with air and the air-fuel mixture is ignited and combusted. The combustion gases are passed in heat exchange relationship with a conduit carrying a stream of fuel to decompose the fuel, forming a fuel stream containing hydrogen gas for starting internal combustion engines.

U.S. Pat. No. 4,567,857 discloses an arrangement wherein methanol is decomposed. A flow through a catalytic reactor selectively catalytically decomposes the methanol into a soot-free, hydrogen-rich product gas. The engine exhaust at temperatures of 200 degrees to 650 degrees centigrade provides the heat for vaporizing and decomposing the methanol. The reactor is combined with either a spark ignited or compression ignited internal combustion engine or a gas turbine to provide a combustion engine system. The system may be fueled entirely by the hydrogen-rich gas produced in the methanol decomposition reactor or the system may be operated on mixed fuels for transient power gain and for cold start of the engine system. The reactor includes a decomposition zone formed by a plurality of elongated cylinders which contain a body of vapor-permeable methanol decomposition catalyst, preferably a shift catalyst such as copper-zinc. A vaporizer is provided for vaporizing liquid methanol prior to introduction into the elongated cylinders. Exhaust gas from the internal combustion engine is passed in contact with the elongated cylinders to supply the heat needed for methanol decomposition. The partially cooled exhaust gases are then passed to the vaporizer where residual heat in the exhaust is utilized in vaporization of liquid methanol.

U.S. Pat. No. 4,735,186 discloses a method of operating an internal combustion engine, including recycling at least a portion of the exhaust gases produced by the engine, reacting the recycled gas with a hydrocarbon fuel to produce a reformed fuel by cracking molecules of the hydrocarbon fuel. During an induction stroke an air supply is delivered to the cylinder combustion chamber separately from a supply of the reformed fuel.

DISCLOSURE OF INVENTION

The present invention relates to a method and apparatus which inexpensively, efficiently, and effectively utilizes the heated exhaust gases from an internal combustion engine to break down or reform a liquid hydrocarbon fuel to a fuel composed substantially or even wholly of hydrogen gas for combustion in the internal combustion engine.

The invention is characterized by its relative simplicity and low expense. The apparatus and method of the present invention may be utilized to convert a wide variety of liquid hydrocarbon fuels to produce a clean usable fuel with few or no pollutants.

The apparatus of the invention is characterized by its simplicity of construction and compactness. It requires no catalysts for its operation. The apparatus may be readily installed in association with virtually any type of internal combustion engine, including those of cars and other vehicles. Vehicles incorporating the present invention will have emission levels equal to or less than emissions of a new vehicle incorporating conventional smog control equipment, greatly holding down costs.

The apparatus of the present invention is for use with an internal combustion engine for supplying fuel to the internal combustion engine.

The apparatus includes a fuel chamber defining a chamber interior for holding a quantity of liquid hydrocarbon fuel, Means is provided for receiving heated exhaust gases from the internal combustion engine for directing the heated exhaust gases into engagement with the chamber exterior to heat the chamber and for introducing the heated exhaust gases into the chamber interior to contact the liquid hydrocarbon fuel, This results in vaporization of the liquid hydrocarbon fuel to form a mixture of vaporized liquid hydrocarbon fuel and heated exhaust gases.

Means defining a passageway is in communication with the chamber interior for receiving the mixture of vaporized liquid hydrocarbon fuel and heated exhaust gases from the chamber interior.

Means is operatively associated with the passageway defining means for receiving heated exhaust gases from the internal combustion engine and directing the heated exhaust gases into engagement with the passageway defining means to heat the mixture of vaporized liquid hydrocarbon fuel and heated exhaust gases in the passageway and reform at least a portion of the mixture of vaporized liquid hydrocarbon fuel and heated exhaust gases to hydrogen gas for combustion in the internal combustion engine.

The method of supplying fuel to an internal combustion engine of the present invention includes the step of delivering liquid hydrocarbon fuel into a fuel chamber interior.

After the liquid hydrocarbon fuel has been delivered into the fuel chamber interior, heated exhaust gases from the internal combustion engine are introduced into the fuel chamber interior.

The next step comprises contacting the liquid hydrocarbon fuel in the fuel chamber interior with the heated exhaust gases introduced into the fuel chamber interior to vaporize the liquid hydrocarbon fuel and form a mixture of vaporized liquid hydrocarbon fuel and heated exhaust gases. Vaporization is promoted by also heating the fuel chamber and its contents by directing heated exhaust gases against the exterior of the fuel chamber.

The mixture of vaporized liquid hydrocarbon fuel and heated exhaust gases are passed through a passageway in communication with the fuel chamber interior.

The mixture of vaporized liquid hydrocarbon fuel and heated exhaust gases in the passageway is heated with heated exhaust gases from the internal combustion engine to reform at least a portion of the mixture of vaporized liquid hydrocarbon fuel and heated exhaust gases in the passageway to hydrogen gas. The hydrogen gas is combusted in the internal combustion engine.

Other features, advantages, and objects of the present invention will become apparent with reference to the following description and accompanying drawings.

BRIEF DESCRIPTION OF DRAWINGS

FIG. 1 is a side, elevational view of apparatus constructed in accordance with the teachings of the present invention;

FIG. 2 is a front, elevational view of the apparatus;

FIG. 3 is a top view of the apparatus;

FIG. 4 is a sectional view taken along the line 4—4 in FIG. 3;

FIG. 5 is a sectional view taken along the line 5—5 in FIG. 3;

FIG. 6 is a cross-sectional view taken along the line 6—6 in FIG. 2;

FIG. 7 is a side, schematic view illustrating selected structural components of the apparatus and depicting flow of gases, liquids, and vapors through the apparatus; and FIG. 8 is a top, diagrammatic view illustrating selected components of the apparatus and depicting flow of gases, liquids, and vapors therethrough during operation.

BEST MODE FOR CARRYING OUT THE INVENTION

Referring now to the drawings, apparatus constructed in accordance with the teachings of the present invention includes a fuel chamber 10 defining a chamber interior 12 for holding a quantity of liquid hydrocarbon fuel 14. Such fuel may, for example, comprise, among other things, gasoline, diesel fuel, crude oil, or even used motor or transmission oil. The present invention may be employed with a wide variety of liquid hydrocarbon fuels.

The liquid hydrocarbon fuel employed is delivered to the fuel chamber interior 12 through any suitable conventional float device 16 which delivers the liquid hydrocarbon fuel through a connector pipe 18. The liquid hydrocarbon fuel enters the chamber interior 12 through the bottom 20 of the fuel chamber.

An air pressure line 22 leads from the chamber interior 12 back to the float device 16 and the float operates in a conventional manner to maintain the level of the liquid hydrocarbon fuel 14 within the chamber interior at a predetermined level above fuel chamber bottom 20 and below the top 24 of the fuel chamber 10. Liquid hydrocarbon fuel enters an inlet 26 of the float device 16 from a tank or other suitable source of supply (not shown). It is preferred that a fuel atomizing grid 28 of conventional construction be disposed above the fuel chamber bottom 20.

Surrounding fuel chamber 10 is a plenum 30 having an outer wall 32. The inner wall 34 of the plenum is the cylindrical wall of fuel chamber 10. The plenum is closed by a plenum top 36 and a plenum bottom 38.

An inlet 40 provides communication between the exhaust outlet of an internal combustion engine (not shown) and the plenum chamber 42 of the plenum. That is, exhaust gases from the internal combustion engine are routed through any suitable connector pipe arrangement (not shown) to inlet 40 so that the hot exhaust enters the plenum chamber 42 under pressure through inlet 40. The heated exhaust gases circulate about the plenum, which has a generally circular configuration, heating the fuel chamber 10 and its contents, and exit from a plenum exit 44 to the ambient atmosphere. This operation is shown in FIGS. 7 and 8 wherein arrows G are employed to depict in schematic fashion the circular path traversed by the heated exhaust gases. A baffle plate 46 disposed within the plenum chamber 42 terminates circular movement of the heated exhaust gases and assure their exit through plenum exit 44. Heating of the fuel chamber by exhaust gases in the plenum will contribute to vaporization of the fuel 14 therein.

Located at plenum exit 44 is a conduit 50 having an open entry end 52 and an exit end 54. Exit end 54 communicates with chamber interior 12 and the conduit 50 delivers a portion of the heated exhaust gases exiting the plenum to the chamber interior. Preferably a butterfly valve or other suitable valve arrangement actuated by member 56 is employed in conjunction with conduit 50 to regulate the flow of heated exhaust gases therethrough.

The heated exhaust gases entering chamber interior 12 will directly contact the liquid hydrocarbon fuel 14 in the fuel chamber interior. This will cooperate with the heated fuel chamber circumferential wall contacted by exhaust gases in the plenum to cause vaporization of the liquid hydrocarbon fuel and formation of a mixture of vaporized liquid hydrocarbon fuel and heated exhaust gases. The mixture will be displaced from the chamber interior into a passageway 60 defined by a conduit 62 having a conduit wall 64 of circular cross section and a conduit entry end 66 located above the fuel chamber bottom 20 and the fuel in the chamber interior. The conduit 62 is preferably formed from copper or other suitable material which conducts heat efficiently. FIGS. 7 and 8 depict by arrows M the flow of the mixture of vaporized liquid hydrocarbon fuel and heated exhaust gases within the chamber interior 12 and passageway 60.

The conduit 62 has a segment thereof within plenum chamber 42, the conduit segment being spaced from the plenum walls and suspended between the plenum top and bottom so that the conduit 62 is contacted by the heated exhaust gases in the plenum chamber about the entire periphery thereof.

This arrangement will result in heating of the conduit 62 by the counter-current flow of heated exhaust gases in the plenum with consequent further heating of the mixture of vaporized liquid hydrocarbon fuel and heated exhaust gases within the passageway 60 defined by conduit 62. Sufficient additional heating of the mixture within the confines of passageway 60 will cause a reaction of the mixture with resultant combustion and reformation thereof to a hydrogen-rich fuel. For such a result to take place, the mixture within passageway 60 should be heated to at least 300 degrees centigrade. In the arrangement illustrated, reformation of the fuel/exhaust mixture will take place at a location within the passageway such as that depicted by symbol 70. The bold arrows downstream from symbol 70 depict the passage of hydrogen gas downstream and on its way to the internal combustion engine where the hydrogen gas will be combusted.

It will be seen from the foregoing description that the method according to the present invention includes the step of delivering liquid hydrocarbon fuel into a fuel chamber interior.

After the liquid hydrocarbon fuel has been delivered into the fuel chamber interior, heated exhaust gases are introduced from the internal combustion engine into the plenum chamber and into the fuel chamber interior.

The liquid hydrocarbon fuel in the fuel chamber interior is directly contacted by the heated exhaust gases introduced into the fuel chamber interior to vaporize the liquid hydrocarbon fuel and form a mixture of vaporized liquid hydrocarbon fuel and heated exhaust gases. Heating of the liquid hydrocarbon fuel also occurs, of course, as a result of the heating of the fuel chamber by the heated exhaust gases passing through the plenum.

The mixture of vaporized hydrocarbon fuel and heated exhaust gases are passed through a passageway in communication with the fuel chamber interior. The mixture of vaporized liquid hydrocarbon fuel and heated exhaust gases in the passageway are further heated (indirectly and not through direct contact) with heated exhaust gases from the internal combustion engine to reform at least a portion of the mixture of vaporized liquid hydrocarbon fuel and heated exhaust gases in the passageway to hydrogen gas. The hydrogen gas is then combusted in the internal combustion engine.

I claim:

1. Apparatus for use with an internal combustion engine for supplying fuel to said internal combustion engine, said apparatus comprising, in combination:
   a fuel chamber defining a chamber interior for holding a quantity of liquid hydrocarbon fuel, said liquid hydrocarbon fuel occupying only a portion of said chamber interior;
   means for receiving heated exhaust gases from said internal combustion engine for heating said fuel chamber and liquid hydrocarbon fuel in said chamber interior and for substantially simultaneously introducing said heated exhaust gases into said chamber interior to directly contact the heated liquid hydrocarbon fuel in said fuel chamber interior and vaporize the heated liquid hydrocarbon fuel in said fuel chamber interior to form a mixture of vaporized liquid hydrocarbon fuel and heated exhaust gases within said fuel chamber interior adjacent to said liquid hydrocarbon fuel;
   means defining a passageway in communication with said chamber interior for receiving said mixture of vaporized liquid hydrocarbon fuel and heated exhaust gases from said chamber interior; and
   means operatively associated with said passageway defining means for receiving heated exhaust gases from said internal combustion engine and directing said heated exhaust gases into engagement with said passageway defining means to heat the passageway defining means and the mixture of vaporized liquid hydrocarbon fuel and heated exhaust gases in the passageway and reform at least a portion of said mixture of vaporized liquid hydrocarbon fuel and heated exhaust gases to hydrogen gas for combustion in said internal combustion engine.

2. The apparatus according to claim 1 wherein said fuel chamber has a bottom and a top and wherein said passageway defining means comprises a conduit including a conduit wall and a conduit entry end, said conduit entry end being located above said fuel chamber bottom and above the liquid hydrocarbon fuel within the chamber interior.

3. The apparatus according to claim 2 additionally comprising means for delivering liquid hydrocarbon fuel to said fuel chamber interior and maintaining the level of liquid hydrocarbon fuel in said fuel chamber below said conduit entry end.

4. The apparatus according to claim 1 wherein said means for receiving heated exhaust gases from said internal combustion engine for heating said fuel chamber and liquid hydrocarbon fuel in said chamber interior and for substantially simultaneously introducing said heated exhaust gases into said chamber interior includes a plenum defining a plenum chamber accommodating said heated exhaust gases, said plenum having a plenum inlet for the ingress of heated exhaust gases into said plenum chamber and a plenum outlet for the egress of heated exhaust gases from said plenum chamber.

5. The apparatus according to claim 4 wherein said passageway defining means comprises a conduit having at least a segment thereof within said plenum chamber and engaged by the heated exhaust gases in said plenum chamber.

6. The apparatus according to claim 4 wherein said means for receiving heated exhaust gases from said internal combustion engine for heating said fuel chamber and liquid hydrocarbon fuel in said chamber interior and for substantially simultaneously introducing said heated exhaust gases into said chamber interior includes conduit means having spaced first and second ends, said conduit means first end being in fluid-flow communication with said plenum chamber for receiving heated exhaust gases from said plenum chamber and said conduit means second end being in fluid-flow communication with said chamber interior for introducing heated exhaust gases from said plenum chamber into said chamber interior.

7. The apparatus according to claim 4 wherein said plenum at least partially encompasses said fuel chamber and said plenum chamber is at least partially defined by said fuel chamber whereby said fuel chamber is engaged and heated by heated exhaust gases in said plenum chamber to heat the liquid hydrocarbon fuel in said chamber interior and contribute to the vaporization of the liquid hydrocarbon fuel in said chamber interior.

8. The apparatus according to claim 5 wherein said plenum chamber defines a substantially circular flow path for heated exhaust gases in said plenum chamber and wherein said conduit segment has a substantially circular configuration.

9. The apparatus according to claim 8 wherein said plenum includes plenum walls defining said plenum chamber and wherein said conduit segment is suspended within said plenum chamber and out of engagement with said plenum walls.

10. The apparatus according to claim 1 additionally comprising a grid in said fuel chamber interior.

11. A method of supplying fuel to an internal combustion engine, said method comprising the steps of:

delivering liquid hydrocarbon fuel into a fuel chamber defining a fuel chamber interior so that the liquid hydrocarbon fuel occupies only a portion of said fuel chamber interior;

after said liquid hydrocarbon fuel has been delivered into said fuel chamber interior, heating said fuel chamber and liquid hydrocarbon fuel in said fuel chamber with exhaust gases from said internal combustion engine while substantially simultaneously introducing heated exhaust gases from said internal combustion engine into said fuel chamber interior adjacent to the liquid hydrocarbon fuel in the fuel chamber interior;

directly contacting the liquid hydrocarbon fuel in said fuel chamber interior with the heated exhaust gases introduced into said fuel chamber interior to vaporize said liquid hydrocarbon fuel and form a mixture of vaporized liquid hydrocarbon fuel and heated exhaust gases within the fuel chamber interior adjacent to the liquid hydrocarbon fuel occupying a portion of the fuel chamber interior;

passing the mixture of vaporized liquid hydrocarbon fuel and heated exhaust gases through a passageway in communication with said fuel chamber interior;

heating the mixture of vaporized liquid hydrocarbon fuel and heated exhaust gases in said passageway with heated exhaust gases from said internal combustion engine to reform at least a portion of said mixture of vaporized liquid hydrocarbon fuel and heated exhaust gases in said passageway to hydrogen gas; and combusting said hydrogen gas in said internal combustion engine.

12. The method according to claim 11 wherein said passageway is at least partially positioned in a plenum chamber, said heating step including flowing heated exhaust gases from said internal combustion engine through said plenum chamber.

13. The method according to claim 12 wherein the heated exhaust gases introduced into said fuel chamber interior flow through said plenum chamber indirectly heating the liquid hydrocarbon fuel prior to being introduced into said fuel chamber interior.

* * * * *